(12) United States Patent
Ikeda

(10) Patent No.: US 7,916,189 B2
(45) Date of Patent: Mar. 29, 2011

(54) IMAGE PROCESSING APPARATUS AND METHOD FOR COLOR-NOISE REDUCTION

(75) Inventor: Eiichiro Ikeda, Yokohama (JP)

(73) Assignee: Canon Kabushiki Kaisha (JP)

( * ) Notice: Subject to any disclaimer, the term of this patent is extended or adjusted under 35 U.S.C. 154(b) by 211 days.

(21) Appl. No.: 12/338,524

(22) Filed: Dec. 18, 2008

(65) Prior Publication Data

US 2009/0102951 A1     Apr. 23, 2009

Related U.S. Application Data

(63) Continuation of application No. 11/224,818, filed on Sep. 13, 2005, now Pat. No. 7,477,301.

(30) Foreign Application Priority Data

Sep. 13, 2004  (JP) ................................ 2004-265926
Aug. 31, 2005  (JP) ................................ 2005-252481

(51) Int. Cl.
     *H04N 5/217*     (2011.01)
(52) U.S. Cl. ........................................................ 348/241
(58) Field of Classification Search .................. 348/241, 348/222.1, 272, 273
     See application file for complete search history.

(56) References Cited

U.S. PATENT DOCUMENTS

| 5,905,531 | A | 5/1999 | Chiba | |
|---|---|---|---|---|
| 6,556,242 | B1* | 4/2003 | Dunton et al. | 348/220.1 |
| 6,744,916 | B1 | 6/2004 | Takahashi | |
| 6,977,681 | B1 | 12/2005 | Sasai | |
| 7,015,962 | B2* | 3/2006 | Acharya | 348/273 |
| 2001/0055428 | A1 | 12/2001 | Hayashi | |
| 2002/0136447 | A1 | 9/2002 | Link et al. | |
| 2003/0122969 | A1 | 7/2003 | Higuchi | |
| 2003/0174221 | A1 | 9/2003 | Tsuda | |

FOREIGN PATENT DOCUMENTS

JP          2004-15322 A        1/2004

* cited by examiner

*Primary Examiner* — Tuan Ho
(74) *Attorney, Agent, or Firm* — Rossi, Kimms & McDowell LLP

(57) ABSTRACT

In a color-noise reduction circuit in which a color-difference signal of a target pixel is substituted in a random substitution circuit (104) by a color-difference signal of another pixel within an area including the target pixel, a pixel-substitution color-difference signal that is the substituted signal whose high-frequency components are removed in an LPF (106) and the color-difference signal of the target pixel are added together in a summation circuit (108) at a predetermined ratio obtained by a pixel-substitution utilization rate calculation circuit (107), and is outputted as a noise-reduced color-difference signal of the target pixel. Therefore, efficient color-noise reduction and suppression of occurrence of color jitters can be realized.

5 Claims, 13 Drawing Sheets

IMAGE PROCESSING APPARATUS AND METHOD FOR COLOR-NOISE REDUCTION

This is a continuation of U.S. patent application Ser. No. 11/224,818 filed Sep. 13, 2005.

FIELD OF THE INVENTION

The present invention relates to a color-noise reduction technology that can suitably be applied to image-sensing apparatuses utilizing an image sensor, such as a digital camera and a video camera.

BACKGROUND OF THE INVENTION

Color-image-sensing apparatuses employing a photoelectric transducer (image sensor), such as a CCD and a CMOS sensor, have been commonly utilized. In these image-sensing apparatuses, by making light that has passed through a color filter enter an image sensor, color-image sensing is realized through an image sensor incapable of discriminating color.

FIG. 11 is a block diagram illustrating an example of a signal processing circuit of an image-sensing apparatus utilizing a single-plane type image sensor having a primary color filter as illustrated in FIG. 12.

Black-balance adjustment and white-balance adjustment are applied to the output signal of an image sensor (a CCD, in this case) 1001 in an OB circuit 1002 and a WB circuit 1003, respectively. The output of a color interpolation circuit 1004 is converted by a color conversion circuit 1005 into color-difference signals (R−Y, B−Y), to which, in a CSUP (Chroma Suppress) circuit 1006, false-color reduction processing is applied with regard to saturated areas. Meanwhile, the output of the WB circuit 1003 is converted by a luminance interpolation circuit 1007 into a luminance signal (Yh), edge portions of which are then enhanced by an edge-enhancement (APC) circuit 1008. The color-difference signals from the CSUP circuit 1006 and the luminance signal from the edge-enhancement circuit 1008 are converted by a color conversion circuit 1009 into RGB signals, to which gamma correction is applied by a gamma circuit 1010, in accordance with an output device such as a monitor. The output signal of the gamma circuit 1010 is converted by a color conversion circuit 1011 into YUV signals.

Due to downsizing and an increased number of pixels, of an image sensor, in recent years, the pixel pitch has significantly been minimized. In consequence, dark current noise and light shot noise generated by an image sensor have become conspicuous. In particular, for example, when imaging sensitivity is raised, noise conspicuously occurs. Noise can be roughly divided into dot-shaped luminance noise that occurs in a luminance signal and spot-shaped color noise that occurs in a color signal. Among these, color noise is low-frequency random noise that is a factor contributing to significant deterioration of picture quality.

To date, a method has been known in which, by utilizing a lowpass filter that passes components, of a signal, whose frequency is the same as, or lower than, that of color noise, color noise is reduced. However, because color noise has a very low frequency-response, thereby making design of a lowpass filter for reducing color noise significantly difficult, there have been problems not only in that an increased number of filter taps makes the scale of a circuit large, but also in that the effect of the lowpass filter is small. In addition, there has been a problem in that, after a color signal passes through a lowpass filter, its frequency bandwidth is narrowed and color jitters occur at the color edges of an image.

In consideration of these problems, Japanese Patent Laid-Open No. 2004-15322 discloses a distributed noise reduction method. This method is to reduce color noise, by randomly distributing low frequency noise through a random substitution method, thereby eventually converting the low frequency noise into high frequency noise, and then by processing the high frequency noise through a lowpass filter.

The distributed noise reduction method that Japanese Patent Laid-Open No. 2004-15322 proposes is suitable for color-noise reduction; however, direct application of the processing to an image-sensing apparatus caused various problems. For example, as an adverse effect of the random substitution, there is such a problem that color jitters (a phenomenon of the blurring of edge portions) occur at edge portions. Due to the fact that original color deviates to a certain hue, that is caused by saturation of an image sensor, there is such a problem that false-color jitters (blurs) occur. Also, there is such a problem that it is not possible to absorb the difference, in the extent of occurrence of noise, that depends on imaging sensitivity or that is caused by temperature variation during taking a picture.

SUMMARY OF THE INVENTION

It is an object of the present invention to solve these issues of conventional technologies.

According to an aspect of the present invention, there is provided a color-noise reduction circuit comprising: pixel substitution means for obtaining a pixel-substitution color-difference signal of a target pixel by substituting an original color-difference signal of the target pixel for a color-difference signal of another pixel residing in an area including the target pixel and by removing high-frequency components from the substituted color-difference signal of the target pixel, and for outputting a noise-reduced color-difference signal of the target pixel by adding the original color-difference signal of the target pixel and the pixel-substitution color-difference signal of the target pixel; differential-signal generating means for obtaining a luminance differential signal and a chroma-saturation differential signal that represent respective differences between a luminance signal and a chroma signal of the target pixel, and a luminance signal and a chroma signal of the another pixel; and pixel-substitution utilization rate calculation means for obtaining a pixel-substitution utilization rate based on the luminance differential signal, the chroma-saturation differential signal and a preliminarily determined threshold value, wherein the pixel substitution means add up the pixel-substitution color-difference signal and the original color-difference signal of the target pixel, based on a pixel-substitution utilization rate obtained by the pixel-substitution utilization rate calculation means.

According to another aspect of the present invention, there is provided a color-noise reduction method comprising: pixel substitution step for obtaining a pixel-substitution color-difference signal of a target pixel by substituting an original color-difference signal of the target pixel for a color-difference signal of another pixel residing in an area including the target pixel and by removing high-frequency components from the substituted color-difference signal of the target pixel, and for outputting a noise-reduced color-difference signal of the target pixel by adding the original color-difference signal of the target pixel and the pixel-substitution color-difference signal of the target pixel; differential-signal generating step for obtaining a luminance differential signal and a chroma-saturation differential signal that represent respective differences between a luminance signal and a chroma signal of the target pixel, and a luminance signal and a chroma signal of the another pixel; and pixel-substitution utilization rate calculation step for obtaining a pixel-substitution utilization rate based on the luminance differential signal, the chroma-saturation differential signal and a preliminarily determined threshold value, wherein the pixel substitution step add up the pixel-substitution color-difference signal and the original color-difference signal of the target pixel, based on a pixel-substitution utilization rate obtained by the pixel-substitution utilization rate calculation step.

According to another aspect of the present invention, there is provided a computer program that cause a computer to perform the color-noise reduction method according to the present invention and a computer-readable storage medium storing that program.

Owing to a configuration such as this, according to the present invention, efficient reduction of color noise and suppression of occurrence of color jitters can concurrently be provided.

Other objects and advantageous besides those discussed above shall be apparent to those skilled in the art from the description of a preferred embodiment of the invention which follows. In the description, reference is made to accompanying drawings, which from a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 2:
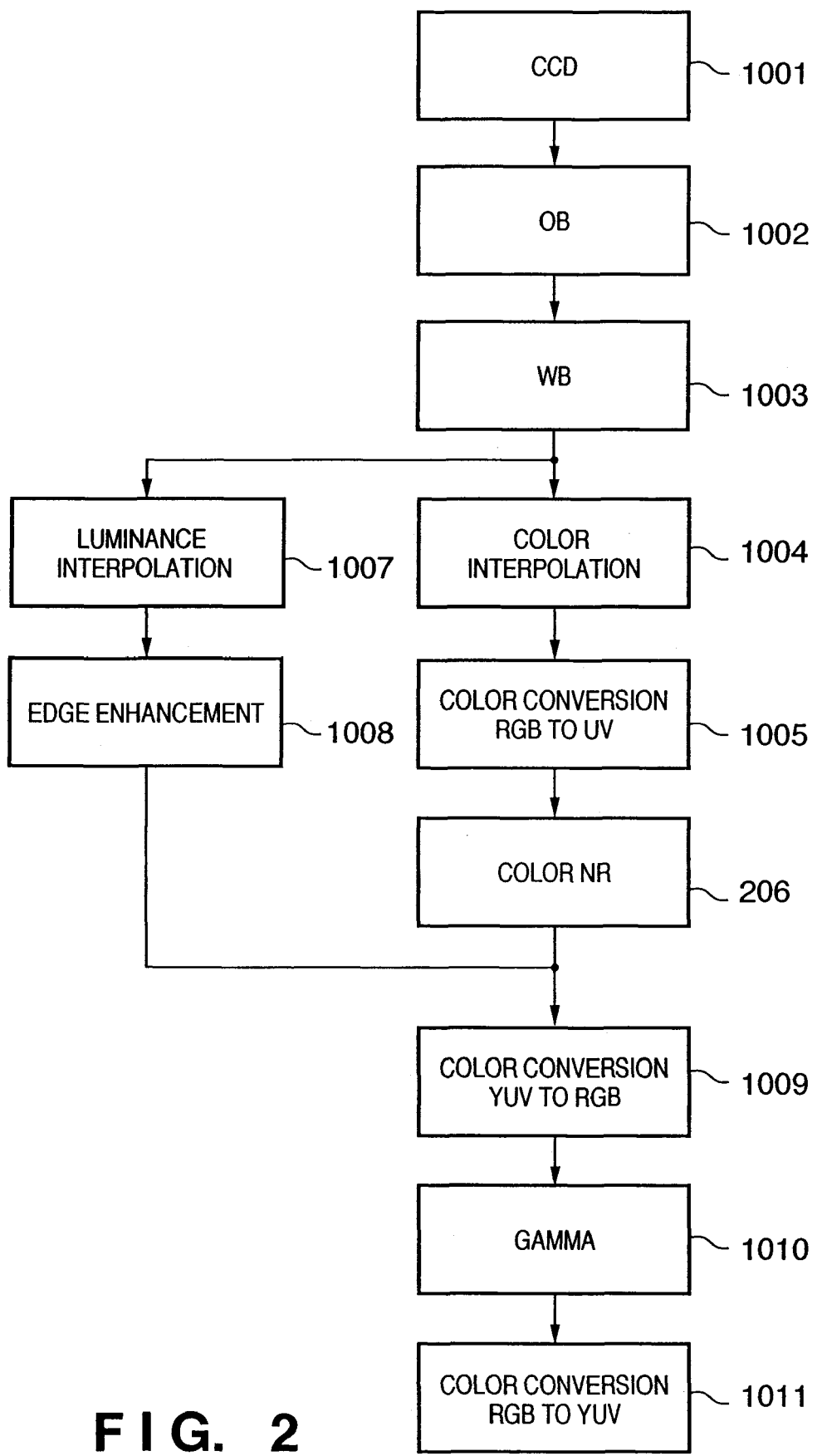
FIG. 2 is a block diagram illustrating an example of a configuration of a signal processing circuit for an image-sensing apparatus utilizing the color-noise reduction circuit in FIG. 1.

FIG. 2 is a block diagram illustrating an example of a configuration of a signal processing circuit, in an image-sensing apparatus, that utilizes a color-noise reduction circuit according to Embodiment 1 of the present invention. In FIG. 2, constituent elements the same as those in FIG. 11 are indicated by the same reference numerals.

Figure 11:
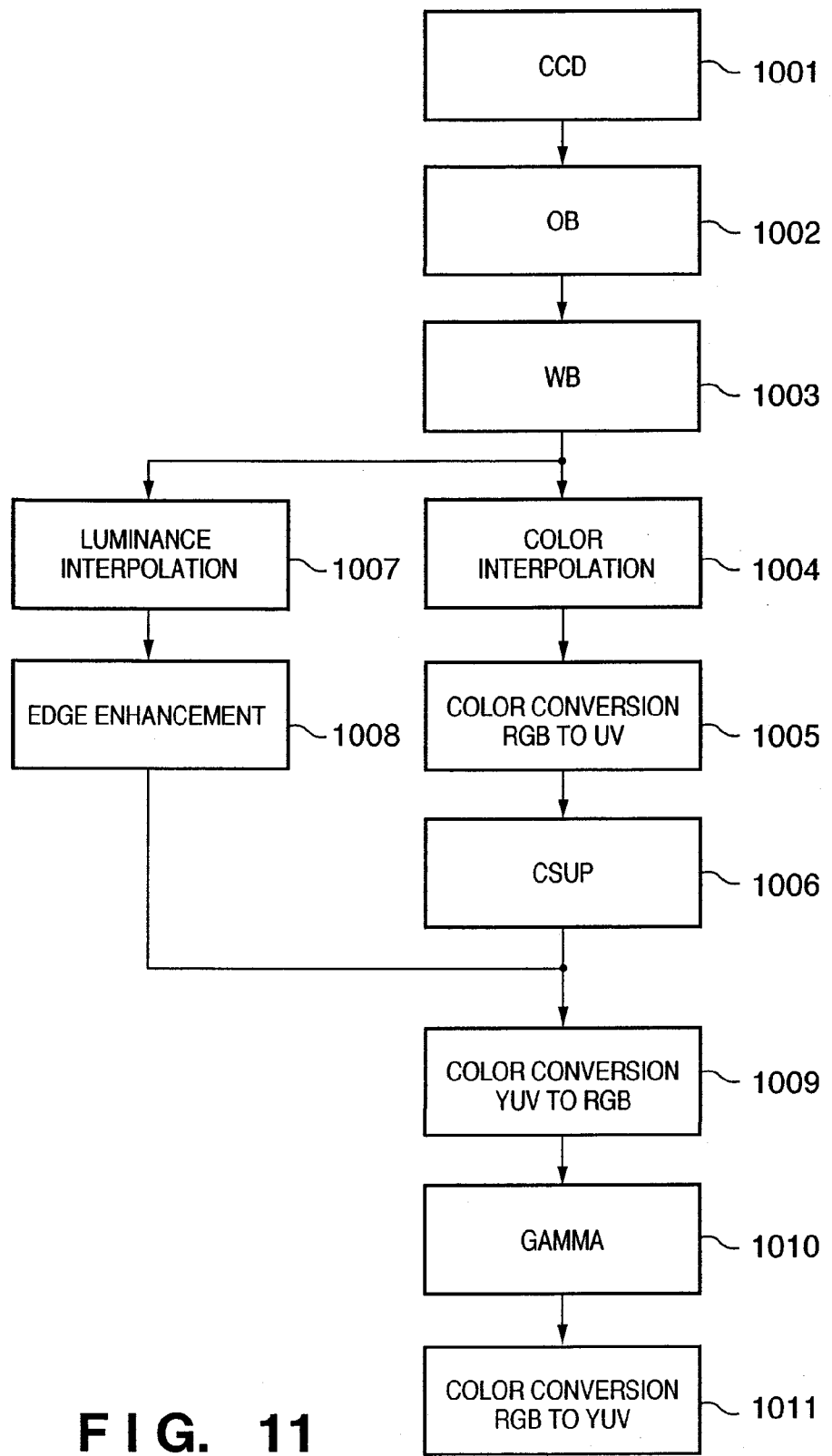
FIG. 11 is a block diagram illustrating an example of a configuration of a signal processing circuit of a conventional image-sensing apparatus.
Figure 12:
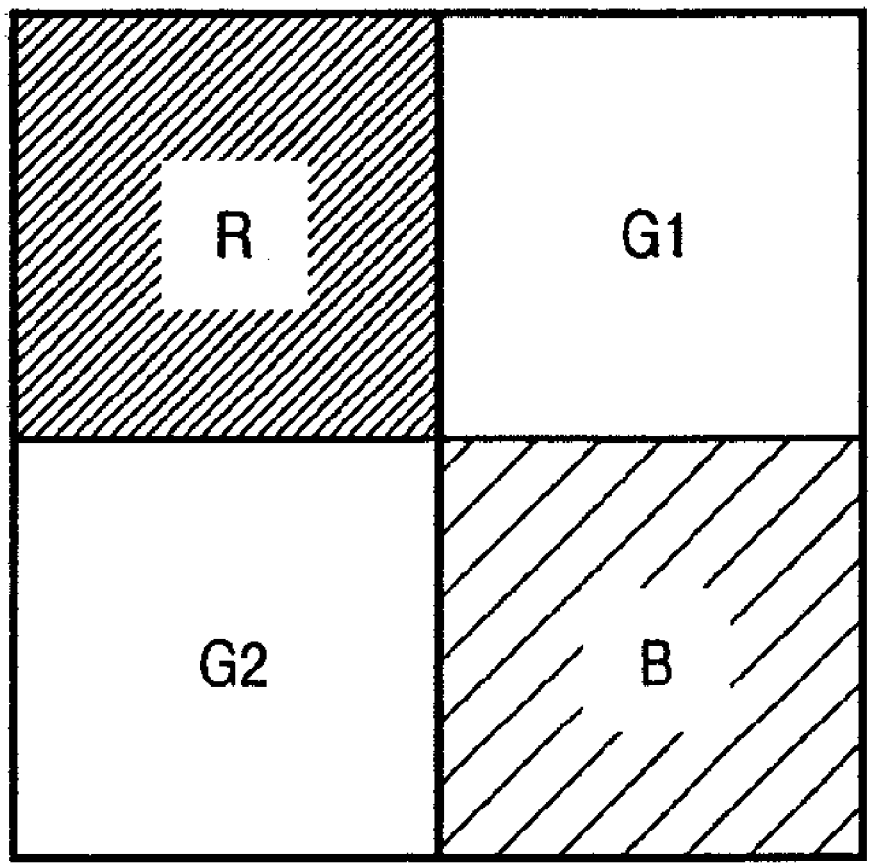
FIG. 12 is a diagram illustrating an example of color arrangement of a primary-color filter.

As can be seen by comparing FIG. 11 with FIG. 2, Embodiment 1 differs in that, instead of the CSUP 1006, a color-noise reduction (color NR) circuit 206 is provided. Because processing other than the color NR circuit 206 is as described above, explanation will be omitted.

Figure 1:
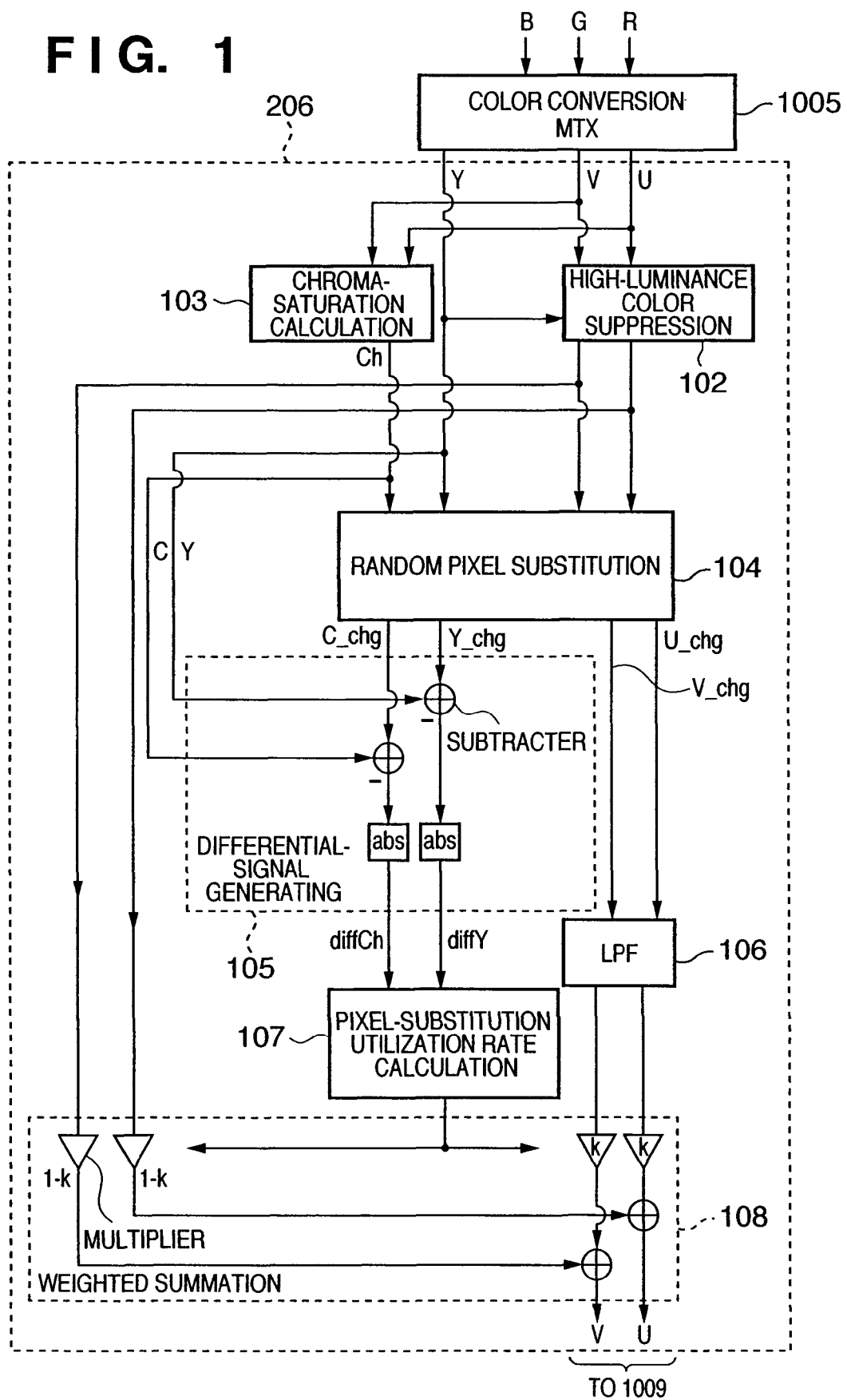
FIG. 1 is a block diagram illustrating an example of a configuration of a color-noise reduction circuit according to an embodiment of the present invention.

FIG. 1 is a block diagram illustrating an example of a configuration of the color-noise reduction circuit 206 that is a characteristic configuration of Embodiment 1.

Color-difference signals U (B−Y) and V (R−Y) and a luminance signal Y that are outputted by the color conversion circuit 1005 are inputted to the color NR circuit 206. A chroma-saturation calculation circuit 103 creates a chroma signal C from the color-difference signals U and V, based on Equation (1) below.

$$C = \sqrt{U^2 + V^2} \quad (1)$$

Figure 10:
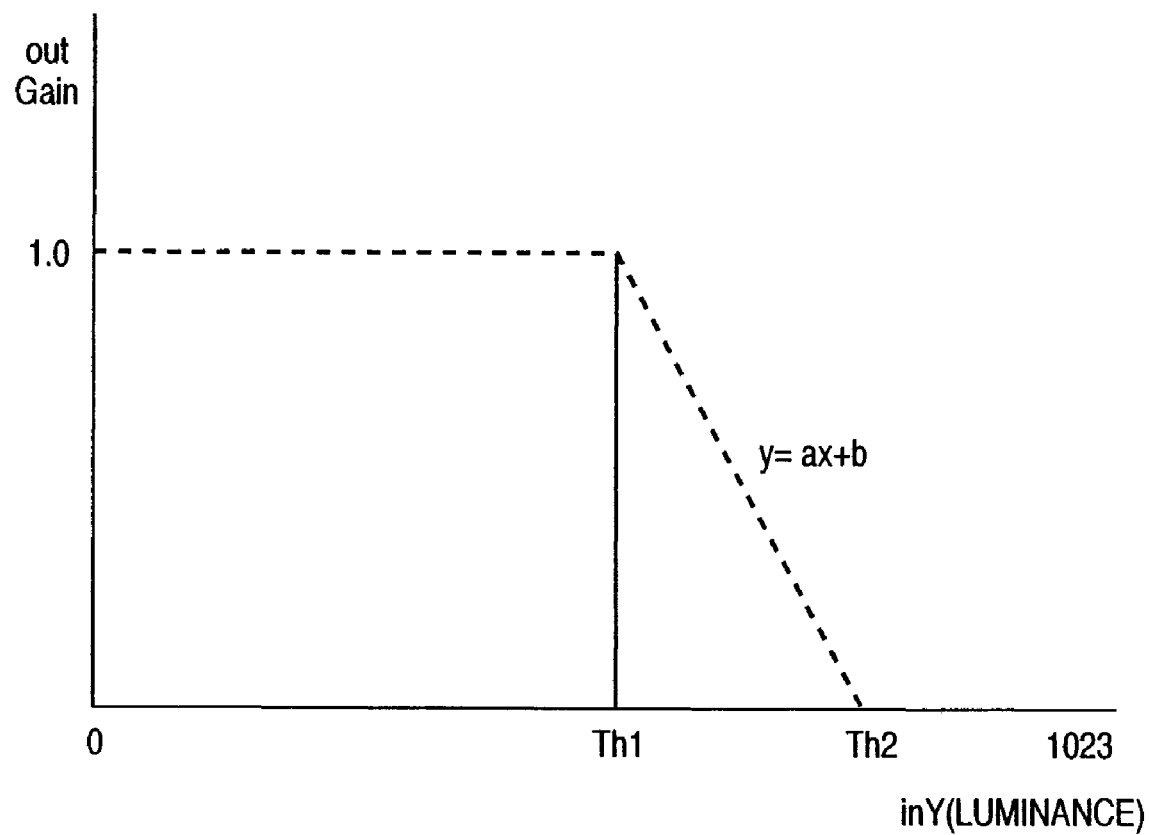
FIG. 10 is a diagram representing an example of properties of a high-luminance color suppression circuit 102 in FIG. 1.

Meanwhile, the color gain, in high-luminance area, of color-difference signals U and V is suppressed by a high-luminance color suppression circuit 102. Due to unevenness, in color sensitivity, of color filters utilized in the CCD 1001, with regard to pixels in high-luminance areas, a G signal saturates earlier than signals R and B, for example, in an image sensor utilizing primary color filters. Accordingly, because there is a temporal margin until the signals R and B saturate, color is likely to be magenta-tinged. In order to prevent discoloration such as this, the high-luminance color suppression circuit 102 suppresses color gain in high-luminance areas. FIG. 10 is a diagram representing an example of properties of a high-luminance color suppression circuit. With a color gain vs. luminance signal curve as in FIG. 10 being preliminarily prepared, by referring to a luminance signal at a target pixel, color gain Cgain can be calculated.

For example, if the luminance value Y (ranges from 0 to 1023) is the same as or less than Th1, Cgain(i, j)=1.0;
if Th1≦Y≦Th2,
Cgain(i, j)=a×Y(i, j)+b;
and if Th2<Y≦1023,
Cgain(i, j)=0.

Accordingly, the signals U and V outputted from the high-luminance color suppression circuit 102 are given by Equation (2) below:

$$U(i,j) = U(i,j) \times Cgain(i,j)$$

$$V(i,j) = V(i,j) \times Cgain(i,j) \quad (2)$$

In embodiment 1, the high-luminance color suppression circuit 102 is arranged before a random substitution circuit 104; therefore, substitution of pixels are implemented after color in high-luminance areas is corrected. Accordingly, saturation color jitters at edges of colored portions can be prevented that occur in the case where, before colors in high-luminance areas are corrected, random substitution of pixels is implemented.

The color-difference signals U and V from the high-luminance color suppression circuit 102, the luminance signal Y from the color conversion circuit 1005, the chroma signal C from the chroma-saturation calculation circuit 103 are each inputted to the random pixel substitution circuit 104. The random pixel substitution circuit 104 converts the input signals into color-difference signals and a chroma signal at an arbitrary pixel position within a preliminarily set area.

Figure 13:
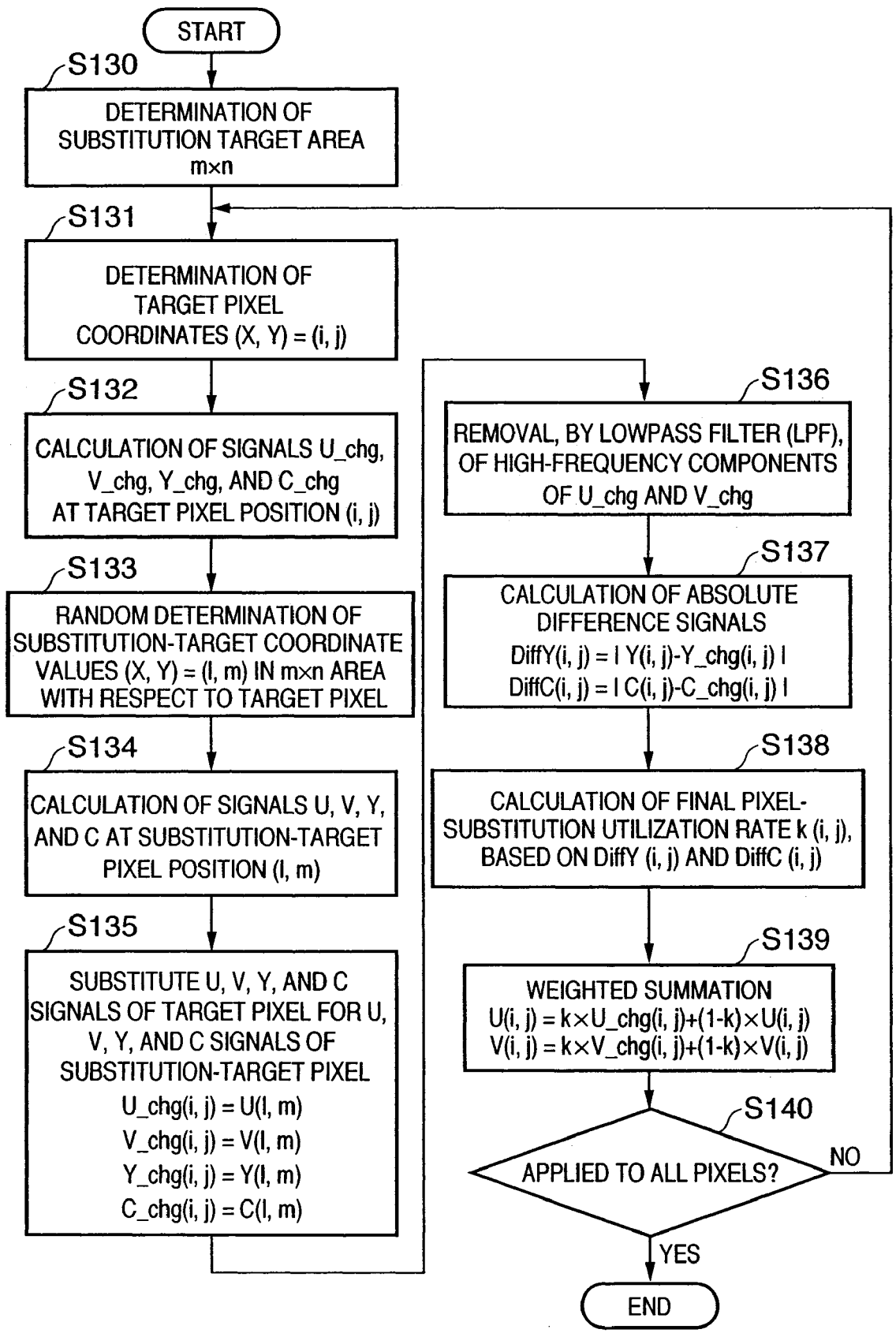
FIG. 13 is a flowchart for explaining the operation of a random pixel substitution circuit 104.

In this regard, the operation of the random pixel substitution circuit 104 will further be explained with reference to a flowchart in FIG. 13.

Figures 3A, 3B:
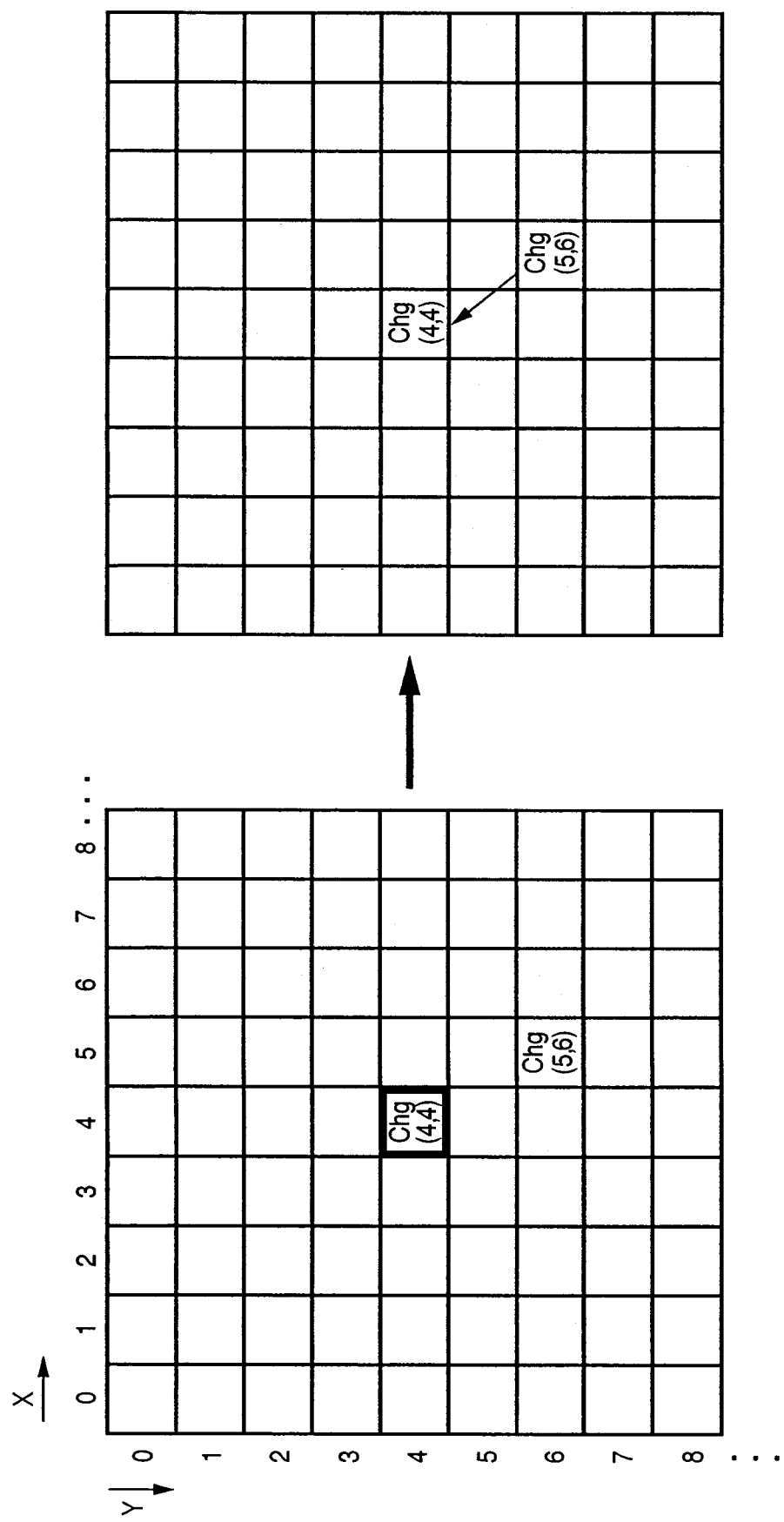
FIGS. 3A and 3B are diagrams for explaining random pixel-substitution.

In the first place, a substitution target area of m×n is determined (S130). In the second place, target pixel coordinate values to be substituted are determined (S131). In the third place, the color-difference signals U and V and the luminance signal Y, and the chroma signal C, at the target pixel position (4, 4), are calculated by the color conversion matrix 1005 and the chroma-saturation calculation circuit 103, respectively (S132). FIGS. 3A and 3B represent an example of substituting an arbitrary pixel in the substitution target area of 9×9 pixels with respect to the target pixel coordinate values (4, 4) of the target pixel coordinate values (4, 4).

Assuming that the coordinate values of a target pixel is represented as (X, Y)=(i, j) (in the example in FIG. 3A, (X, Y)=(4, 4)), a substitution-target pixel coordinate values is randomly determined as (X, Y)=(l, m) within a pixel substitution target area (in the example in FIG. 3A, (X, Y)=(5, 6)) (S133). In addition, signals U, V, Y, and C of the substitution-target pixel are respectively calculated (S134).

Thereafter, as represented in FIG. 3B, the color-difference signals U and V, the luminance signal Y, and the chroma signal C, at target pixel position (4, 4), are substituted by the color-difference signals U and V, the luminance signal Y, and the chroma signal C, of the substitution-target pixel (5, 6) and then outputted (S135). Letting U_chg, V_chg, Y_chg, and C_chg denote the substituted signals U, V, Y, and C, respectively, the following equations are given:

$$U\_chg(i,j)=U(l,m)$$

$$V\_chg(i,j)=V(l,m)$$

$$Y\_chg(i,j)=Y(l,m)$$

$$C\_chg(i,j)=C(l,m).$$

The high-frequency-components of the U and V signals U_chg and V_chg as outputs of the random pixel substitution circuit 104 are reduced by a lowpass filter (LPF) 106 (S136).

In addition, in a differential-signal generating circuit 105, with regard to a target pixel, differential-absolute-value signals DiffY(i, j) and DiffC(i, j) are created from differences between a luminance value Y(i, j) and a luminance value Y_chg(i, j) outputted from the random pixel substitution circuit 104 and between a chroma-saturation value C(i, j) and a chroma-saturation value C_chg(i, j) outputted from the random pixel substitution circuit 104, respectively (S137).

In other words, the following equations are given:

$$DiffY(i,j)=|Y(i,j)-Y\_chg(i,j)|$$

$$DiffC(i,j)=|C(i,j)-C\_chg(i,j)| \quad (3)$$

A pixel-substitution utilization rate calculation circuit 107 calculates a pixel-substitution utilization rate k(i, j), by utilizing the luminance differential-absolute-value signal DiffY(i, j) and the chroma-saturation differential-absolute-value signal DiffC(i, j) (S138).

By utilizing the calculated pixel-substitution utilization rate k, weighted summations of the signals U and V of the original image and the substituted signals U_chg and V_chg are made in accordance with Equation (4) below:

$$U(i,j)=k\times U\_chg(i,j)+(i-k)\times U(i,j)$$

$$V(i,j)=k\times V\_chg(i,j)+(i-k)\times V(i,j) \quad (4)$$

After processing is implemented on the entire substitution-target pixels, the pixel-substitution processing is ended (S140).

A method of calculation, of the pixel-substitution utilization rate k(i, j), that is implemented in S137 through S138 by the pixel-substitution utilization rate calculation circuit 107, will be explained in detail below. In Embodiment 1, a first substitution-pixel utilization rate l(i, j) and a second substitution-pixel utilization rate m(i, j) are obtained from the luminance differential-absolute-value signal DiffY(i, j) and the chroma-saturation differential-absolute-value signal DiffC(i, j), respectively. Thereafter, a final substitution-pixel utilization rate k(i, j) is obtained from the first and second substitution-pixel utilization rates.

(1) Calculation of the First Pixel-Substitution Utilization Rate l(i, j)

Figure 4:
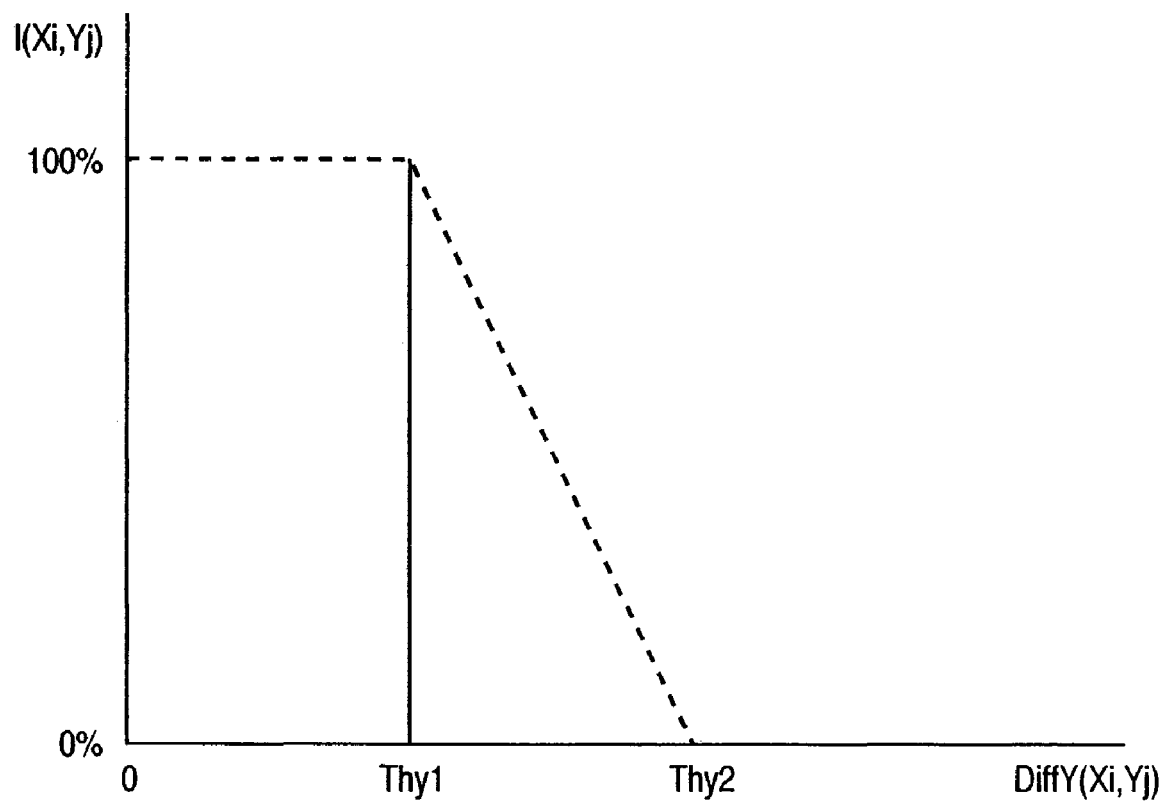
FIG. 4 is a diagram for explaining a method in which a pixel-substitution utilization rate calculation circuit 107 in FIG. 1 calculates a first pixel-substitution utilization rate.

FIG. 4 is a diagram representing a relationship between the value of the luminance differential-absolute-value signal DiffY(i, j) and the first pixel-substitution utilization rate l(i, j), in Embodiment 1.

If the value of the luminance differential-absolute-value signal DiffY is large, the probability of being a luminance edge portion is high. If pixel substitution is applied at a luminance edge portion, color jitters may occur; therefore, by changing through the value of the luminance differential-absolute-value signal the pixel-substitution utilization rate, occurrence of blurs is suppressed.

In addition, in Embodiment 1, a flat portion and an edge portion are discriminated, by determining a luminance edge portion, based on the value of the luminance differential-absolute-value signal DiffY. However, a flat portion may be detected through the frequency response of an image signal. Moreover, in the case where the area of a flat portion is large, the substitution target area may be set to be large, and in the case where the area of a flat portion is small, the substitution target area may also be set to be small.

Specifically, when the value of the luminance differential-absolute-value signal DiffY represented in FIG. 4 is smaller than a preliminarily set threshold value Thy1, it is determined that the portion is not a luminance edge portion, and the pixel-substitution utilization rate l(i, j) is set to 100% (100-percent pixel substitution is utilized). When DiffY is from Thy1 to Thy2, the utilization rate is calculated through a linear equation as Equation (5); when DiffY is larger than Thy2, pixel substitution is not utilized:

$$l(i,j)=a\times DiffY(i,j)+b \quad (5)$$

where, a and b are constants and a<0, b>0.

In this situation, if the luminance threshold value Thy, especially Thy1 is set to be large, the pixel substitution rate becomes high as a whole; therefore, color-noise components scatter randomly, thereby enhancing the effect of noise reduction implemented thereafter by the LPF 106. However, if the threshold value Thy is made to be too large, the pixel-substitution utilization rate at a luminance edge portion is also raised; accordingly, color jitters occur as an adverse effect. Thus, setting of the threshold value Thy is a crucial point in terms of making both improvement of color-noise reduction effect and suppression of color-jitter occurrence be provided.

In this regard, Embodiment 1 is characterized by that, by changing the luminance threshold values Thy1 and Thy2, in accordance with conditions that relate to the amount of occurrence of luminance-noise components, such as the imaging sensitivity of an image-sensing apparatus, temperature of an image sensor, and a signal-processing setting mode, appropriate threshold values in accordance with conditions are utilized.

Figure 5:
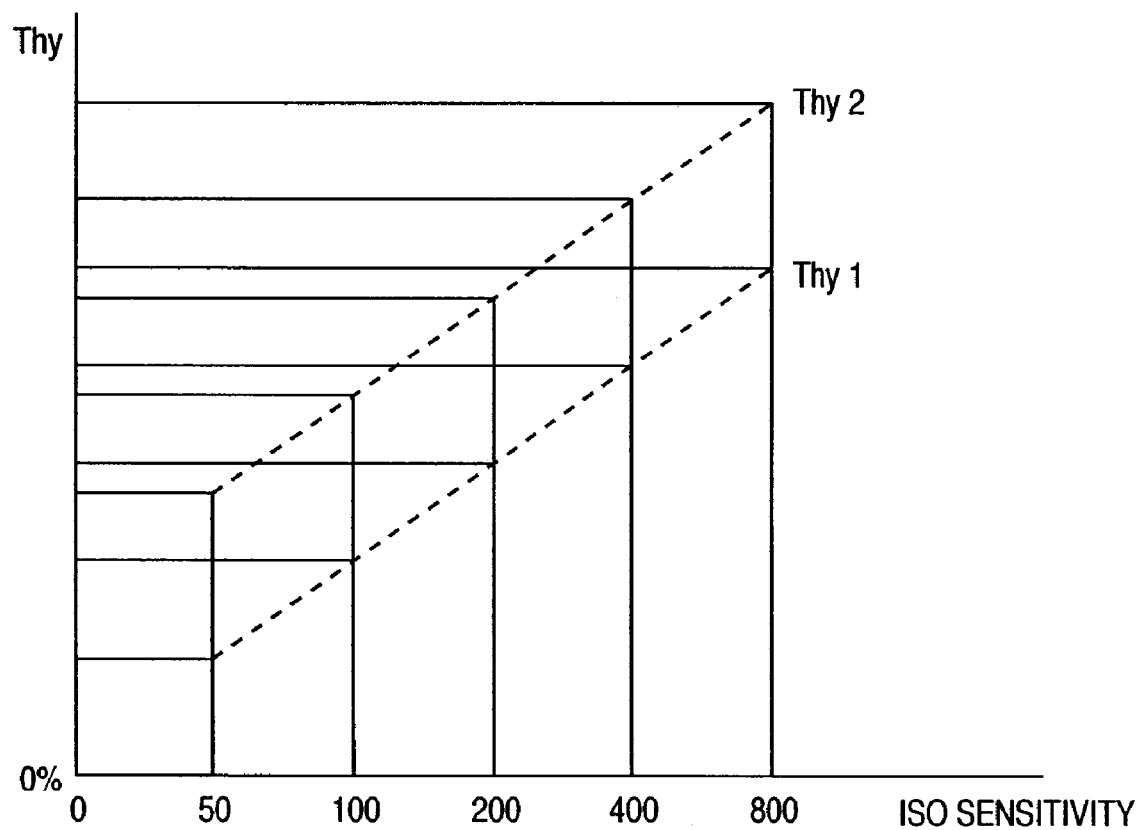
FIG. 5 is a diagram for explaining a method of changing for each imaging sensitivity threshold values utilized to determine the first pixel-substitution utilization rate.

FIG. 5 is a diagram representing an example of a relationship between the imaging sensitivity of a camera and the threshold values. FIG. 5 represents as input the ISO Sensitivity for image taking and as output the Thy values (Thy1 and Thy2) for each sensitivity. The higher the sensitivity is, the larger luminance noise components are; thus, by setting the threshold values to be large, erroneous discrimination of a luminance edge portion due to increased luminance noise is prevented. In addition, specific threshold values can be set for each sensitivity, in accordance with the amount, of occurrence of luminance noise, that is preliminarily measured for each sensitivity.

Figure 6:
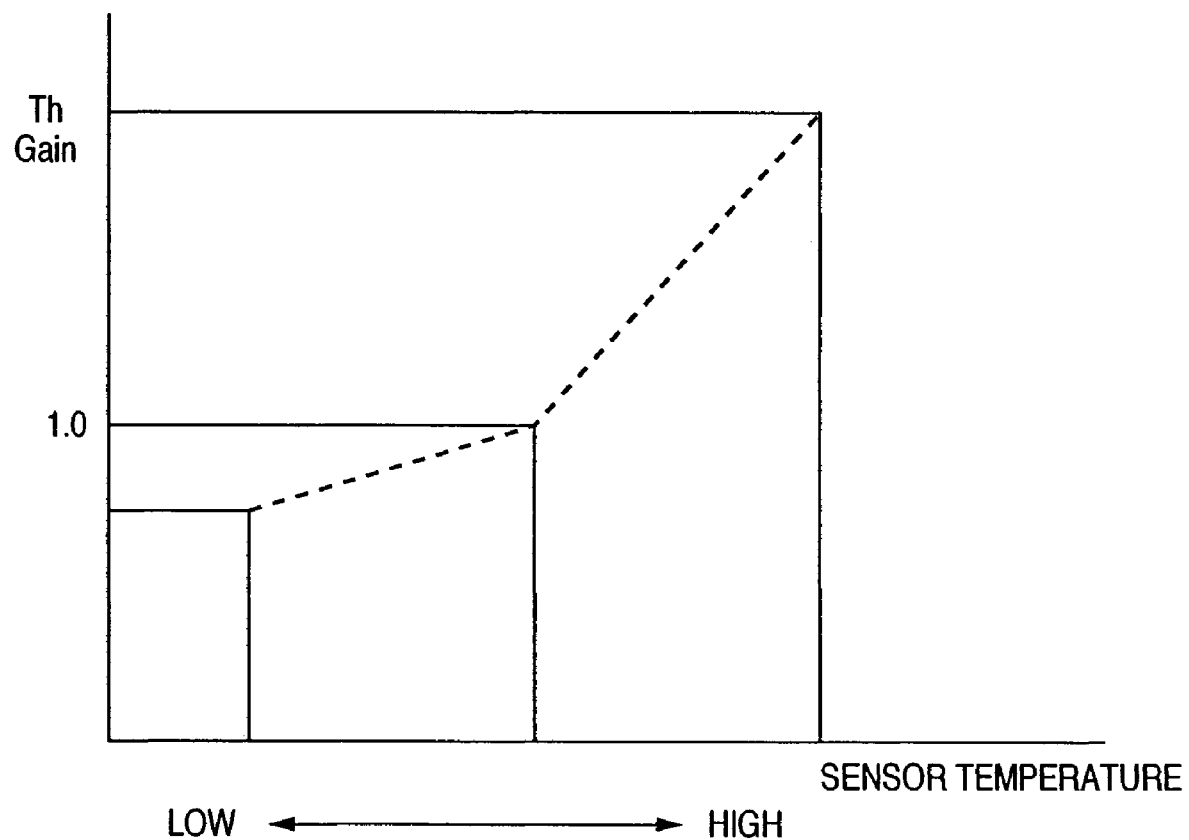
FIG. 6 is a diagram for explaining a method of correcting the threshold values in FIG. 5, in accordance with the temperature of an image sensor.

Moreover, as represented in FIG. 6, by multiplying the threshold value for each sensitivity by the compensation value (gain) in accordance with the temperature of the image sensor, the threshold values can be set, with an increase or a decrease in noise, due to temperature during image taking, being considered. FIG. 6 represents the temperature of a sensor as input and the gain as output. The higher the temperature of the image sensor is, the larger noise components are; thus, in the case where the temperature of the image sensor is higher than a predetermined temperature, the threshold value is compensated further largely, by utilizing a gain larger than one. In contrast, when the temperature of the image sensor is low, the threshold value is slightly compensated, by utilizing a gain smaller than one.

Figure 7:
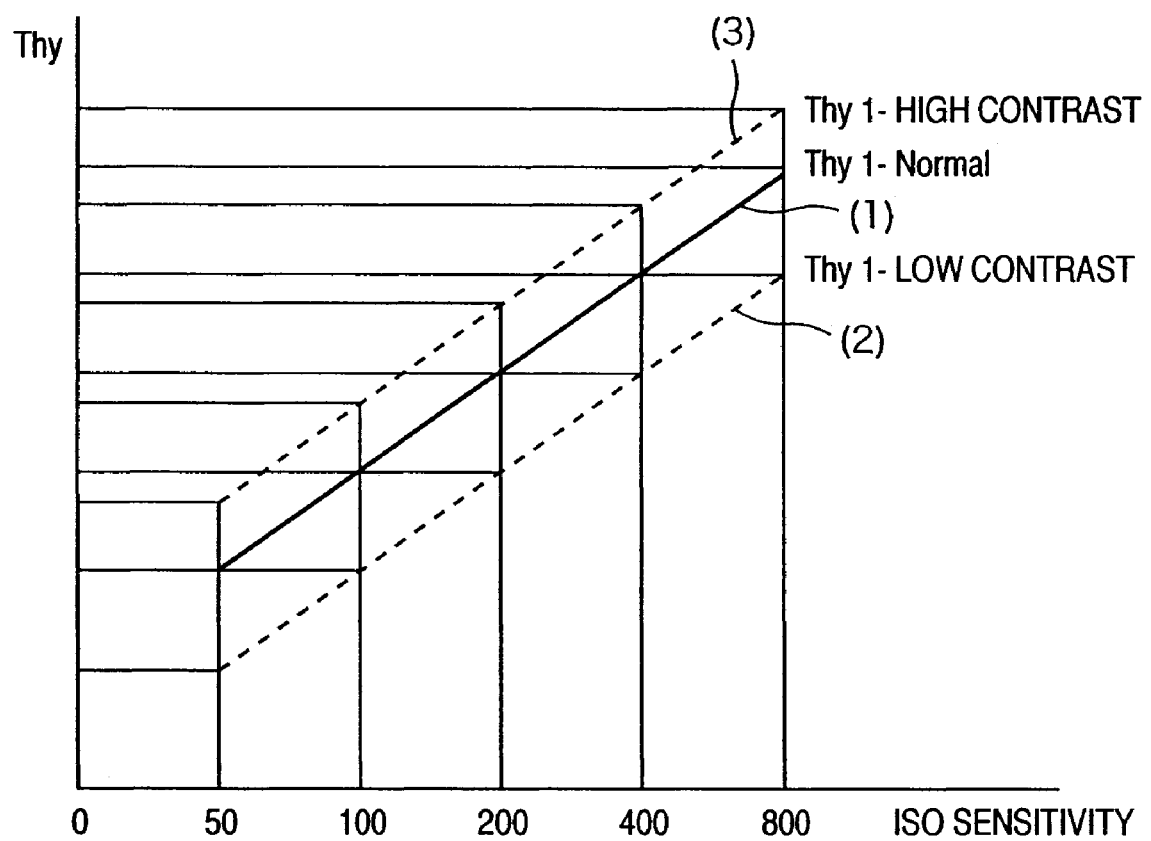
FIG. 7 is a diagram for explaining a method of changing the threshold values utilized to calculate the first pixel-substitution utilization rate, in accordance with a signal-processing setting mode and imaging sensitivity.

In addition, as represented in FIG. 7, Embodiment 1 is characterized by that the luminance threshold values are changed in accordance with the operation-setting modes of a camera, e.g., modes for varying the contrast. FIG. 7 represents that the luminance threshold value Thy1 (also Thy2) is set not only for each imaging sensitivity of a camera but also for each signal-processing setting mode. Reference numeral (1) represents a normal mode; (2), a mode in which the contrast is made lower than that in the normal mode; and (3), a mode in which the contrast is made higher than that in the normal mode. If the contrast is set to be high, noise components also become large; therefore, by making Thy large, the effect of noise reduction is enlarged. In contrast, if the contrast is set to be low, noise components become small; therefore, by making Thy small, color jitters are suppressed.

(2) Calculation of the Second Pixel-Substitution Utilization Rate m(i, j)

Next, calculation processing of the second pixel-substitution utilization rate m(i, j) will be explained.

Figure 8:
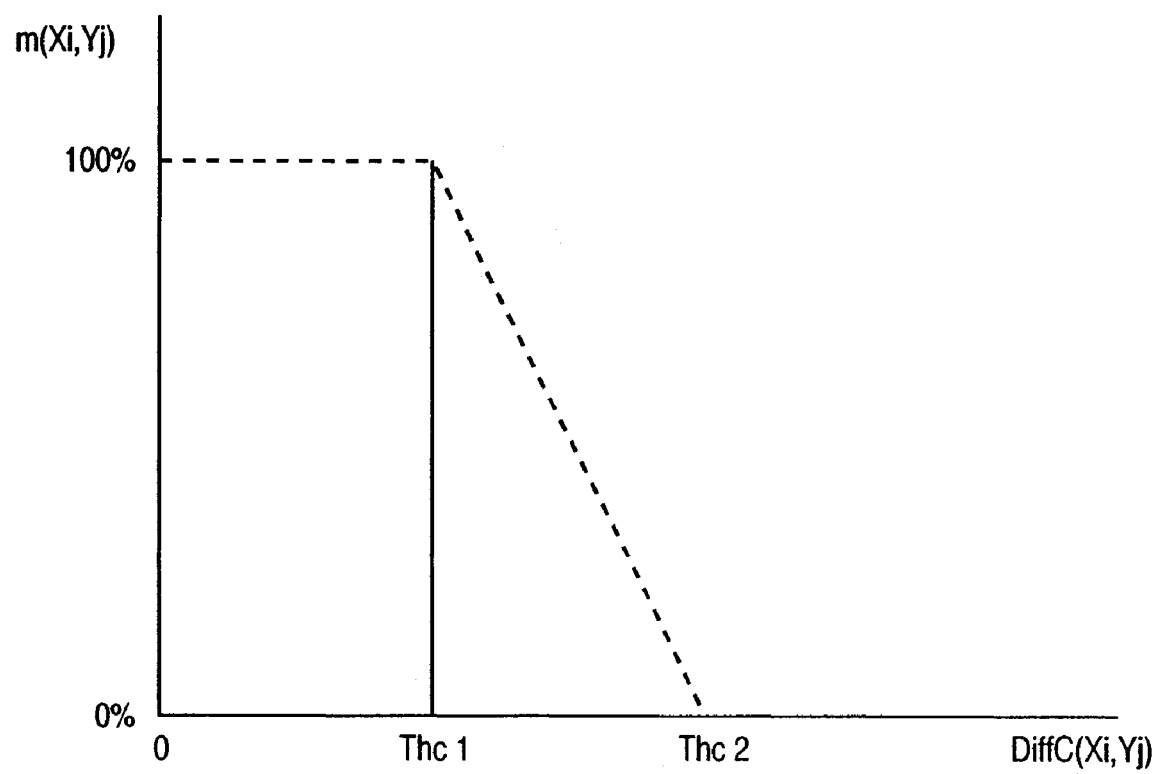
FIG. 8 is a diagram for explaining a method in which the pixel-substitution utilization rate calculation circuit 107 in FIG. 1 calculates a second pixel-substitution utilization rate.

FIG. 8 is a diagram representing a relationship between the value of the chroma-saturation differential-absolute-value signal DiffC(i, j) and the second pixel-substitution utilization rate m(i, j), in Embodiment 1.

If the value of the chroma-saturation differential-absolute-value signal DiffC is large, the probability of being a different hue edge portion is high. If pixel substitution is applied at a hue edge portion, color jitters may occur; therefore, by changing through the value of a hue differential-absolute-value signal the pixel-substitution utilization rate, occurrence of blurs is suppressed.

Specifically, when the value of the hue differential-absolute-value signal DiffC represented in FIG. 8 is smaller than a preliminarily set chroma-saturation threshold value Thc1, it is determined that the portion is not a hue edge portion, and the pixel-substitution utilization rate m(i, j) is set to 100% (100-percent pixel substitution is utilized). When DiffC is from Thc1 to Thc2, the utilization rate is calculated through a linear equation as Equation (6); when DiffC is larger than Thc2, pixel substitution is not utilized:

$$m(i,j)=a \times \text{DiffC}(i,j)+b \qquad (6)$$

where, a and b are constants and a<0, b>0; a and b may be different from those in Equation (5).

As is the case with the luminance threshold values, setting of the chroma-saturation threshold values is a crucial point in terms of making both improvement of color-noise reduction effect and suppression of color-jitter occurrence be provided. Embodiment 1 is characterized by that, as is the case with the calculation of the first pixel-substitution utilization rate, by changing the chroma-saturation threshold values Thc1 and Thc2 in accordance with conditions and using appropriate threshold values. The conditions relate to the amount of occurrence of luminance-noise components, such as the imaging sensitivity of an image-sensing apparatus, temperature of an image sensor, and a signal-processing setting mode, for example.

The reason why the chroma-saturation threshold values are changed in accordance with imaging sensitivity is that it is considered that the higher the imaging sensitivity is, the larger color noise-components are. In other words, by setting the chroma-saturation threshold values Th to be larger with increased color noise, the effect of noise reduction is enhanced. For calculating the chroma-saturation threshold values, a method similar to the foregoing calculation method for the luminance threshold values for each sensitivity is utilized; therefore, explanation therefor will be omitted. In addition, processing of multiplying the threshold value by a compensation gain in accordance with the temperature of the image sensor is similar to the foregoing processing; therefore, explanation therefor will also be omitted.

Figure 9:
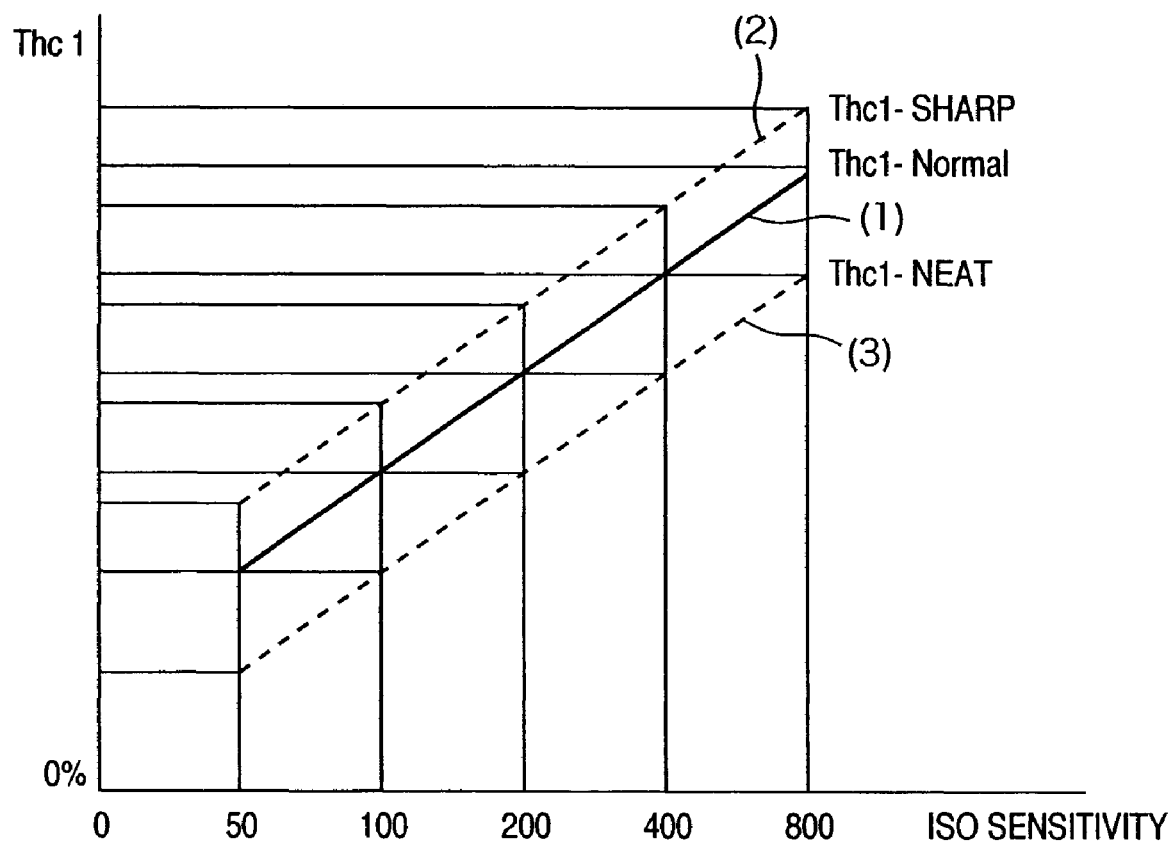
FIG. 9 is a diagram for explaining a method of changing the threshold values utilized to calculate the second pixel-substitution utilization rate, in accordance with a signal-processing setting mode and imaging sensitivity.

In addition, as represented in FIG. 9 Embodiment 1 is characterized by that the chroma-saturation threshold values are changed in accordance with the operation-setting modes of a camera, e.g., modes for varying the color saturation. FIG. 9 represents that the chroma-saturation threshold value Thc1 (also Thc2) is set not only for each imaging sensitivity of a camera but also for each signal-processing setting mode. Reference numeral (1) represents a normal mode; (2), a (high color saturation) mode in which the color saturation is made higher than that in the normal mode; and (3), a (low color saturation) mode in which the contrast is made lower than that in the normal mode. If the color saturation is set to be high, noise components also become large; therefore, by making Th large, the effect of noise reduction is enlarged. In contrast, if the color saturation is set to be low, noise components become small; therefore, by making Th small, color jitters are suppressed.

In addition, by changing the substitution target area (m×n) in accordance with preset imaging sensitivity, appropriate noise-reduction processing can also be implemented. In other words, in the case of low imaging sensitivity, e.g., ISO50, the amount of noise is also small; therefore, the substitution target area is set to be small, e.g., 5×5 (pixels). Accordingly, a high-quality image without color jitters can be obtained. In contrast, in the case of high imaging sensitivity, e.g., ISO1600, the amount of noise increases; therefore, by setting the substitution target area to be large, e.g., 23×23 (pixels), appropriate noise reduction can be implemented.

(3) Calculation of the Final Pixel-Substitution Utilization Rate $k(i, j)$

By utilizing the first pixel-substitution utilization rate $l(i, j)$ and the second pixel-substitution utilization rate $m(i, j)$ that have been obtained as described above, the final pixel-substitution utilization rate $k(i, j)$ is calculated in accordance with Equation (7) below:

$$k(i,j)=l(i,j)\times m(i,j)/100 \qquad (7)$$

By utilizing the calculated pixel-substitution utilization rate k, weighted summations of the signals U and V of the original image and the substituted signals U_chg and V_chg are made in accordance with Equation (4) described above.

As described above, in Embodiment 1, by considering both the pixel-substitution utilization rate obtained for a luminance signal and the pixel-substitution utilization rate obtained for a chroma signal, the final pixel substitution rate is determined. Accordingly, pixel substitution across a luminance edge portion and a hue edge portion is significantly reduced, whereby occurrence of color jitters can significantly be suppressed.

The pixel-substitution utilization rate $k(i, j)$ obtained as described above is supplied to a weighted summation circuit 108. In the weighted summation circuit 108, the weighted summation of the signals U and V outputted from the high-luminance color suppression circuit 102 and the signals U_chg and V_chg that are outputted from the lowpass filter 106 is made, by utilizing the pixel-substitution utilization rate k.

Specifically, the signals U_chg and V_chg that are outputted from the lowpass filter 106 are each multiplied by k/100. On the other hand, the signals U and V that are outputted from the high-luminance color suppression circuit 102 are each multiplied by (1−k/100); what the signal U_chg multiplied by k/100 added to the signal U multiplied by (1−k/100) makes is outputted as a final signal U, and what the signal V_chg multiplied by k/100 added to the signal V multiplied by (1−k/100) makes is outputted as a final signal V.

In this situation, the original signals U and V that are outputted from the high-luminance color suppression circuit 102 are not processed by the lowpass filter 106. This is because color-noise reduction through pixel substitution and a lowpass filter is applied to a flat portion, and the original signals U and V are utilized for an edge portion, in order to prevent an adverse effect due to the pixel substitution and the lowpass filter, i.e., color jitters.

As described above, according to Embodiment 1, in a color-noise reduction circuit in which color noise is reduced through a combination of random pixel substitution and a lowpass filter, pixel-substitution utilization rate is utilized that is changed in accordance with conditions that affect the amount of occurrence of color noise. Accordingly, the color-noise reduction circuit demonstrates an effect in which, while suppressing the occurrence of color jitters at edge portions with regard to luminance and color saturation, good color-noise reduction can be realized.

Other Embodiments

In the foregoing embodiment, a color-noise reduction circuit configured by hardware has been explained; however, at least one or more of functional blocks that configure the color-noise reduction circuit may be realized by software.

In addition, the present invention also includes the case in which a program for the above-described software is supplied directly from a recording medium to a system, or an apparatus, having a computer that can implement the program, and then the computer of the system or the apparatus implements the supplied program, so that an equivalent function is achieved. Or the program may be supplied through wired/wireless communication to the system or apparatus having a computer that can implement the program.

Therefore, program codes themselves realize the present invention, that, in order to realize through a computer functional processing of the present invention, are supplied to and installed in the computer. In other words, a computer program itself for realizing functional processing of the present invention is included in the present invention.

In this regard, the form of the computer program, such as an object code, a program implemented by an interpreter, script data to be supplied to an OS, is no object, as long as the computer program has a function as a program.

Recording media for supplying the program include, for example, a magnetic recording medium such as a flexible disc, a hard disc, and a magnetic tape. Other recording media include an optical/magnetooptical storage medium such as an MO, a CD-ROM, a CD-R, a CD-RW, a DVD-ROM, a DVD-R, and a DVD-RW; and a nonvolatile semiconductor memory.

Program-supplying methods utilizing wired/wireless communication include a method in which a computer program itself that forms the present invention in a server on a computer network, or a file that is compressed and has an auto-install function. Other supplying-methods include a data file (program data file) that can be a computer program that forms the present invention on a client computer, is stored, and the program data file is downloaded to a client computer that is connected to the server. In this case, by dividing the program data file into a plurality of segment files, the segment files may be provided in different servers.

In other words, the present invention includes a server system that allows a plurality of users to download the program data file for realizing functional processing of the present invention, through a computer.

Moreover, it is also possible to realize the functional processing of the present invention, by storing in a storage medium such as a CD-ROM an encrypted program for the present invention and distributing the storage medium to users, by supplying key-related information for decrypting the program to users who meet predetermined conditions, for example, through downloading over the Internet the information from a home page. And the user can also implement the encrypted program by utilizing the key-related information, thereby installing the program in a computer.

Furthermore, by making a computer implement the read-out program, the functions of the foregoing embodiments are realized. Also, by making an OS, or the like, operating on the computer implement part of or all of the actual processing, based on the instructions of the program, the functions of the foregoing embodiments may be realized through that processing.

Still moreover, the program read out from the recording medium is stored in a memory equipped in a function-enhancing board inserted into the computer, or in a function-enhancing unit connected to the computer. Then, a CPU or the like, equipped in the function-enhancing board or in the function-enhancing unit implements part of or all of the actual processing, based on the instructions of the program, realizing the functions of the foregoing embodiments through that processing.

CLAIM OF PRIORITY

This application claims priority from Japanese Patent Application Nos. 2004-265926 filed on Sep. 13, 2004 and 2005-252481 filed on Aug. 31, 2005, which are hereby incorporated by reference herein.

What is claimed is:

1. An image processing apparatus comprising:
   a pixel substitution unit that obtains a color-difference signal based on: a color-difference signal of a target pixel among image signals consist of signals output from an image sensor having a plurality of pixels, a color-difference signal of another pixel residing in an area has been set to include the target pixel, and a pixel-substitution utilization rate, and outputs the obtained color-difference signal as the color-difference signal of the target pixel;
   a differential-signal generating unit that obtains a chroma-differential signal that represent respective differences between a chroma signal of the target pixel and a chroma signal of the another pixel; and
   a calculation unit that compares the chroma-differential signal with a first threshold value and that calculates the pixel-substitution utilization rate so that:
   if the chroma-differential signal is equal to or less than the first threshold value, said pixel substitution unit is to output the color-difference signal of another pixel as the color-difference signal of the target pixel, and
   if the chroma-differential signal is larger than the first threshold value, said pixel substitution unit is to output a color-difference signal obtained by adding the color-difference signal of the target pixel and the color-difference signal of another pixel,
   wherein said calculation unit sets the first threshold value such that the higher a sensitivity set to the image sensor is, the larger the first threshold value is.

2. The image processing apparatus according to claim 1, wherein said calculation unit further compares the chroma-differential signal with a second threshold value, which is larger than the first threshold value, and calculates the pixel-substitution utilization rate so that, if the chroma-differential signal is or larger than the second threshold value, said pixel substitution unit is to output the original color-difference signal of the target pixel as it is.

3. An image processing apparatus comprising:
   a pixel substitution unit that obtains a color-difference signal based on by adding a color-difference signal of a target pixel among pixels included in an image sensor and a color-difference signal of another pixel residing in an area has been set to include the target pixel, and outputs the obtained color-difference signal as the color-difference signal of the target pixel;
   a differential-signal generating unit that obtains a chroma-differential signal that represent respective differences between a chroma signal of the target pixel and a chroma signal of the another pixel; and
   a calculation unit that calculates a pixel-substitution utilization rate from the chroma-differential signal,
   wherein said calculation unit sets the first threshold value such that the higher a sensitivity set to the image sensor is, the larger the area is, and adds the original color-difference signal of the target pixel and the color-difference signal of another pixel based on the calculated pixel-substitution utilization rate.

4. An image processing method comprising:
   pixel substitution step of obtaining a color-difference signal based on: a color-difference signal of a target pixel among image signals consist of signals output from an image sensor having a plurality of pixels, a color-difference signal of another pixel residing in an area has been set to include the target pixel, and a pixel-substitution utilization rate, and outputting the obtained color-difference signal as the color-difference signal of the target pixel;
   differential-signal generating step of obtaining a chroma-differential signal that represent respective differences between a chroma signal of the target pixel and a chroma signal of the another pixel; and
   calculation step of comparing the chroma-differential signal with a first threshold value and calculating the pixel-substitution utilization rate so that:
   if the chroma-differential signal is equal to or less than the first threshold value, said pixel substitution step is to output the color-difference signal of another pixel as the color-difference signal of the target pixel, and
   if the chroma-differential signal is larger than the first threshold value, said pixel substitution step is to output a color-difference signal obtained by adding the color-difference signal of the target pixel and the color-difference signal of another pixel,
   wherein in said calculation step the first threshold value is set such that the higher a sensitivity set to the image sensor is, the larger the first threshold value is.

5. An image processing method comprising:
   pixel substitution step of obtaining a color-difference signal based on by adding a color-difference signal of a target pixel among pixels included in an image sensor and a color-difference signal of another pixel residing in an area has been set to include the target pixel, and outputting the obtained color-difference signal as the color-difference signal of the target pixel;
   differential-signal generating step of obtaining a chroma-differential signal that represent respective differences between a chroma signal of the target pixel and a chroma signal of the another pixel; and
   calculation step of calculating a pixel-substitution utilization rate from the chroma-differential signal,
   wherein in said calculation step, the first threshold value is set such that the higher a sensitivity set to the image sensor is, the larger the area is, and said calculation step adds the original color-difference signal of the target pixel and the color-difference signal of another pixel based on the calculated pixel-substitution utilization rate.

* * * * *